J. B. STRAUSS.
CAR STOPPING DEVICE.
APPLICATION FILED NOV. 30, 1914.
1,189,750.
Patented July 4, 1916.
2 SHEETS—SHEET 1.
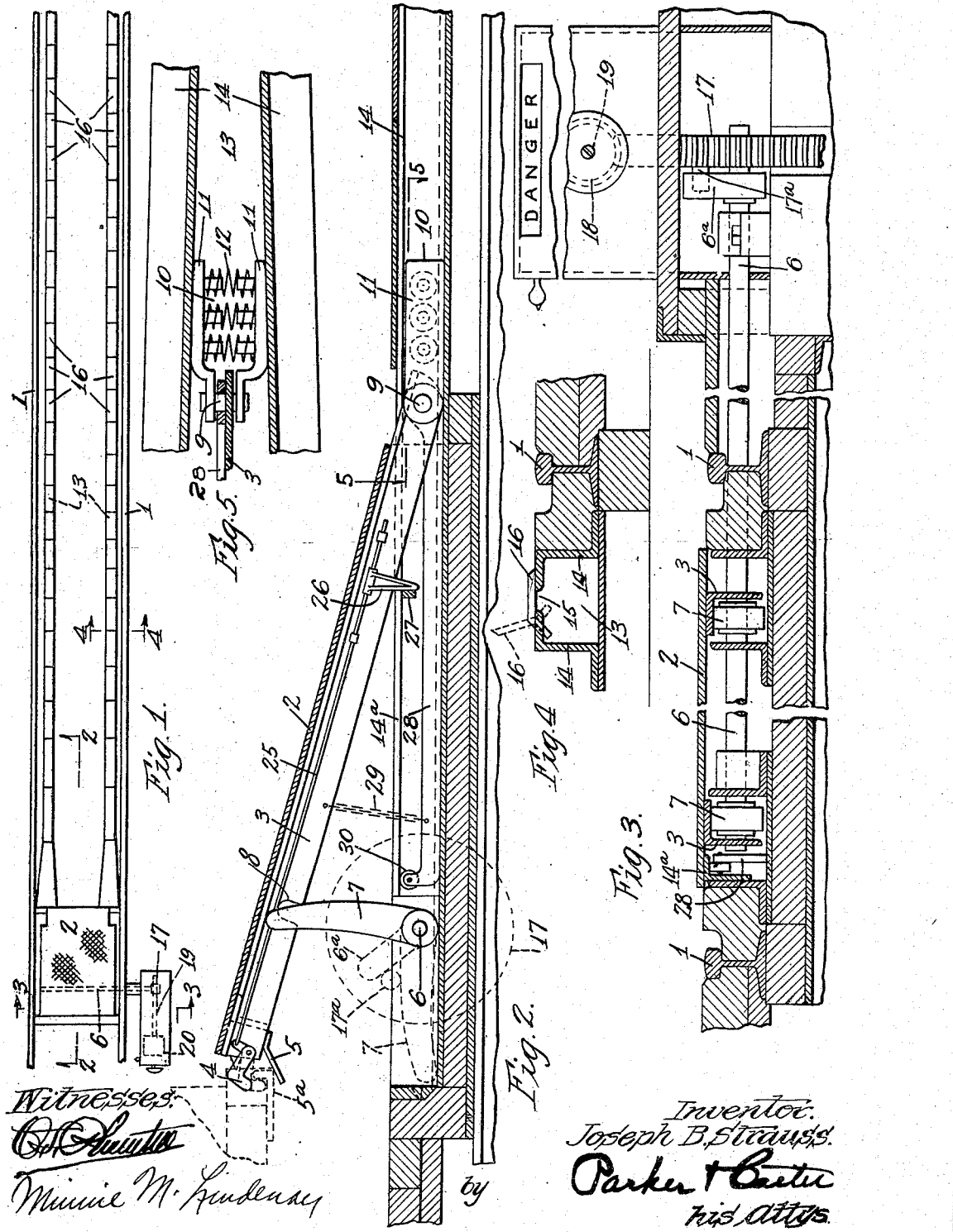
Inventor:
Joseph B. Strauss.

J. B. STRAUSS.
CAR STOPPING DEVICE.
APPLICATION FILED NOV. 30, 1914.

1,189,750.

Patented July 4, 1916.
2 SHEETS—SHEET 2.

Fig. 6.
Fig. 7.

Witnesses:

Inventor:
Joseph B. Strauss.
by Parker & Carter
his Attys.

UNITED STATES PATENT OFFICE.

JOSEPH B. STRAUSS, OF CHICAGO, ILLINOIS.

CAR-STOPPING DEVICE.

1,189,750.  Specification of Letters Patent.  Patented July 4, 1916.

Application filed November 30, 1914. Serial No. 874,571.

*To all whom it may concern:*

Be it known that I, JOSEPH B. STRAUSS, a citizen of the United States, residing at Chicago, in the county of Cook and State of Illinois, have invented a certain new and useful Improvement in Car-Stopping Devices, of which the following is a specification.

This invention relates to bumpers for cars, and has for its object to provide a new and improved device of this description.

The invention is illustrated in the accompanying drawings, wherein,

Figure 1 is a plan view of a device showing the invention, Fig. 2 is an enlarged sectional view taken on line 2—2 of Fig. 1, Fig. 3 is an enlarged view taken on line 3—3 of Fig. 1, Fig. 4 is a sectional view taken on line 4—4 of Fig. 1, Fig. 5 is a sectional view taken on line 5—5 of Fig. 2, Fig. 6 is a plan view of the bumper showing a modified construction, Fig. 7 is a side elevation of the device shown in Fig. 6.

Like numerals refer to like parts throughout the several figures.

Referring now to Figs. 1 to 5 inclusive, I have shown a form of yielding bumper, particularly adapted to be used on paved streets, for the protection of draw bridge approaches, etc. In this construction the car to be stopped passes along the rails 1. Located between the rails is a bumper 2, which is arranged so that when not in use it is down between the rails out of the way and may be moved up to its operative position so as to be struck by the car when it is desired to stop the car.

As herein shown, the bumper 2, consists of a plate which extends across a portion of the space between the rails 1, and which is provided with suitable beams 3 which in this case, are shown as angle-irons, the whole acting as a truss. The bumper is lifted up to its operative position in any desired manner. As herein shown, a shaft 6 extends beneath the bumper and is provided with cams or lifting parts 7. These lifting parts are connected with the shaft and are arranged so that when the shaft is given a partial rotation they engage the bumper and lift it to its operative position as shown in Fig. 2.

The beams 3 are cut away at 8 (see Fig. 2), so that when the bumper is moved down between the rails the shaft passes through these cut-away portions. The lifting parts 7 are not directly connected with the bumper but simply have a sliding connection therewith. Some means is provided for connecting the car with the bumper so that when the car strikes the bumper it will be attached to it and carried along as the car is gradually stopped, and this connecting or attaching device will also cause the car to move the bumper back to its original position when the car moves back along the track. I prefer to provide an automatic attaching or detaching device for automatically connecting and disconnecting the car and the bumper. Any suitable means for this purpose may be used. As illustrated in Fig. 2, the bumper is provided with some suitable coupling device for coupling it with the car. In the particular construction shown this coupling device consists of a movable coupling part 4 and a fixed part 5, both connected with the bumper and the coupling part $5^a$ on the car which is engaged between the parts 4 and 5. Connected with the movable part 4 is a controlling piece 25 which is movable and which is provided with an engaging part 26 adapted to engage a fixed stop 27. When in engagement with this stop the part 4 is lifted so that the part $5^a$ on the car can pass between the parts 4 and 5. As the bumper is struck by the car and the parts 26 and 27 disengage, the coupling part 4 moves into engagement with the coupling part $5^a$ and the car and bumper are thereby automatically coupled together. The car and bumper remain connected and when the car moves back along the track it carries the bumper with it until the part 26 strikes the stop 27, whereupon the coupling part 4 is lifted and the car and bumper are automatically disconnected.

The bumper at the rear end is pivoted by the pivot 9 to the friction or retarding device 10. There are preferably two retarding devices, one connected with each of the beams 3. Each retarding device is provided with two arms or side pieces 11 which are free to move with relation to each other. Some means is provided for resisting their movement toward each other, as for example, the springs 12 located between them and normally tending to press them outwardly. The retarding devices are located in the slideways 13, having sides 14 which converge. These sides gradually approach each other at the rear of the bumpers and the two slideways are on opposite sides or center line of the track. The slideways are arranged to be normally closed. Any suitable means for this purpose may be used. As herein shown, the slideways are provided with slots 15, for the beams 3. These slots are continuous but are normally covered with a series of hinged doors or covers 16. As the device slides back the beams 3 strike these doors and move them up to their open position, shown on dotted lines in Fig. 4. The doors may be arranged to stay open so that the device may be moved back to its normal position. The doors can then be closed. It will be seen that these doors form a sectional cover for the slot which is automatically opened as the bumper is moved rearwardly.

Some means is provided for preventing the bumper from being moved upwardly when struck by the car. Any suitable means for this purpose may be used. As herein shown, an arm 28 projects beneath the bumper and is provided with a flexible connection 29 which connects it with the bumper. The arm 28 is held against an up and down movement and is free to move longitudinally with the bumper when it is moved by the car. This arm may connect with any part of the mechanism which will permit these results. It may, for example, be connected with one of the parts 11, and may be provided with a wheel 30 which runs on the upper inner face of a flange $14^a$ on the side 14.

The shaft 6 may also be used to operate an alarm signal. This alarm may be operated, for example, by the worm wheel 17, which engages a worm 18, on a shaft 19, the shaft operating a sounding and a visual alarm. The shaft 6 may be operated in any desired manner, as for example, by the motor 20.

In Figs. 6 and 7 I have shown a modified construction particularly adapted for use where it is not necessary to move the bumper down level with the surface over which the car passes. In this construction the bumper 2 is provided at its outer end with a standard car coupler head 21. This coupler head is arranged so as to be engaged by the coupler head 22 on the car to be stopped, the two coupler heads being coupled together when the car strikes the bumper. The bumper is provided with a frame 23, having shoes 24, which engage the rails 1, and slide thereon as the bumper is moved rearwardly. This coupler is worked automatically, the coupler pin $21^a$ thereof has connected therewith at 33 a controlling arm 30 slidably mounted in the projecting bracket $23^a$. The end of this bell crank lever is connected with the trip lever 32, which in turn engages a stop 34 which moves it so as to lift the coupler pin 21 in a position to permt the coupler head 22 to make the automatic coupling. When the car strikes the bumper and it moves away from its initial position to release the lever from the trip device the coupler pin falls to its coupling position engaging the coupler head 22 on the car, the bumper and car are therefore coupled together and the car moves back until it is stopped by the retarding device. When the car passes along the track, it moves the bumper back to its initial position, whereupon the trip lever engages the stop device 34, thereby causing the coupler pin $21^a$ to be automatically lifted and disconnected from the coupler head 22, the car being thereby released. This bumper is provided with retarding devices 10, like those shown in Figs. 1 and 2, said retarding devices moving in slideways 13. In this construction the retarding device is shown as being provided with two sets of springs 12, one at each end thereof, the connection to the bumper being made between them. In the construction shown in Figs. 1 to 4, the cam 7, if placed near the front of the bumpers would be so high that they may be struck by the car. In order to permit them to be struck without causing any injury, they may be so arranged as not to be directly connected with the driving shaft of the motor. As shown in these drawings, for example, the cam 7 is connected with the shaft 6, and this shaft is provided with a crank $6^a$. This crank loosely engages the pin $17^a$ connected with the worm gear 17 on the driving shaft. It will be seen that by this construction the cams will be moved to a position to lift the bumper and then the motor is stopped. When the cams are struck by the car they are moved back, the arm $6^a$ automatically disconnecting from the pin $17^a$. When it is desired to return the cams to their initial position, the motor is reversed and the pin $17^a$ moves around and strikes the arm $6^a$, the motor being operated until the arm 6 is moved to a position to bring the cams back to their initial position. When it is desired to again operate the bumper, the motor is given a forward rotation and the pin $17^a$ then moves around and engages the cams 7 on their opposite sides and moves them to their upright position.

It will be noted that in the construction shown in Figs. 1 to 4 inclusive, the bumper is provided with a cover plate which entirely covers and protects the parts of the bumper and the operating mechanism under it from dirt and injury when the bumper is down between the tracks. It will further be noted that the retarding mechanism is also provided with a suitable cover or protecting device for protecting it from dirt and injury and for excluding the dirt from the slideways.

I claim:

1. A car stopping device comprising a movable bumper adapted to be moved to an inoperative position or in position to be struck by the car to be stopped, a retarding device connected with said bumper for retarding its movement, and means for increasing the retarding effect of said retarding device as it is moved in response to the impact of the car.

2. A car stopping device comprising a movable bumper in position to be struck by the car, a retarding device connected with said bumper, said retarding device comprising friction parts, movable with relation to each other and connected with said bumper, a slideway along which said friction parts move and means for gradually increasing the friction between said friction parts and the portions of the slideway they engage as they are moved there along.

3. A car stopping device comprising a movable bumper adapted to be struck by the car, a retarding device to which said bumper is connected, said retarding device comprising two friction parts movable with relation to each other, converging side pieces between which said friction parts move, and a spring connected with the friction parts and arranged to increase the pressure thereon as the friction parts are moved away from their initial position.

4. A car stopping device comprising a bumper adapted to normally lie between the rails along which the car travels so as to be out of the way, a retarding device with which said bumper is movably connected and adapted when moved to retard the movement of the bumper and a controlling device for moving said bumper to an operative position where it will be struck by the car.

5. A car stopping device comprising a bumper adapted to normally lie between the rails along which the car travels so as to be out of the way, a retarding device with which said bumper is movably connected and adapted when moved to retard the movement of the bumper and a controlling device for moving said bumper to an operative position where it will be struck by the car, said controlling device comprising a shaft and lifting device connected with said shaft and adapted to engage the bumper when the shaft is locked so as to lift it, said bumper and lifting device being free to move relatively so that the bumper can be moved away from the lifting device when struck by the car.

6. A car stopping device comprising a bumper, a retarding device with which said bumper is pivotally connected so that it may be moved down out of the way of the car, a slideway along which said retarding device moves when the bumper is struck by the car, a slot in said slideway for the connection between the bumper and the retarding device.

7. A car stopping device comprising a bumper, a retarding device with which said bumper is connected, a slideway along which said retarding device moves when the bumper is struck by the car, a slot in said slideway for the connection between the bumper and the retarding device, a sectional cover for said slot consisting of a series of hinged sections adapted to be automatically opened by said connection as the retarding device is moved along the slideway.

8. A car stopping device comprising a bumper, means for automatically connecting the bumper and the car when the car strikes the bumper, a retarding device connected with said bumper, a slideway along which the retarding device moves as the bumper is moved by the car and means for automatically disconnecting the bumper and the car when the bumper is moved back to its initial position.

9. A car stopping device comprising a movable bumper adapted when struck by the car to move along with the car, means associated with said bumper for gradually stopping the car, a coupler device for coupling the car and bumper together so that the car when it moves back along the track will move the bumper back to its initial position.

10. A car stopping device comprising a movable bumper adapted when struck by the car to move along with the car, means associated with said bumper for gradually stopping the car, a coupler device for coupling the car and bumper together so that the car when it moves back along the track will move the bumper back to its initial position and means for automatically uncoupling said coupling device when the car has moved the bumper back to its initial position.

11. A car stopping device comprising a bumper, a retarding device with which said bumper is connected, a slideway along which said retarding device moves when the bumper is struck by the car, said slideway provided with a slot for the connection between the bumper and the retarding device, a cover for said slot adapted to be automatically opened by said connection as the retarding device is moved along the slideway.

12. A car stopping device comprising a bumper adapted to normally lie between the rails along which the car travels so as to be out of the way, a retarding device with which said bumper is movably connected and adapted when moved to retard the movement of the bumper and a controlling device for moving said bumper to an operative position, where it will be struck by the car, said controlling device comprising an operating mechanism located out of the path of travel.

13. A car stopping device comprising a bumper adapted to normally lie between the rails along which the car travels so as to be out of the way, a retarding device with which said bumper is movably connected and adapted when moved to retard the movement of the bumper and a controlling device for moving said bumper to an operative position where it will be struck by the car, said controlling device comprising an operating mechanism located out of the path of travel and means for controlling the operating mechanism from a distance.

14. A car stopping device comprising a bumper adapted to normally lie between the rails along which the car travels so as to be out of the way, a retarding device with which said bumper is movably connected and adapted when moved to retard the movement of the bumper and a controlling device for moving said bumper to an operative position where it will be struck by the car, and means for preventing upward movement of the bumper when struck.

15. A car stopping device comprising a bumper adapted to normally lie between the rails along which the car travels so as to be out of the way, a retarding device with which said bumper is movably connected and adapted to retard the movement of the bumper and a controlling device for lifting said bumper to an operative position where it will be struck by the car, and self-adjusting means for holding the bumper in its operative position before and after striking.

16. A car stopping device comprising a bumper adapted to normally lie between the rails along which the car travels so as to be out of the way, a retarding device with which said bumper is movably connected and adapted when moved to retard the movement of the bumper and a controlling device for moving said bumper to an operative position where it will be struck by the car, a cover plate associated with the bumper and forming a part of the roadway surface when the bumper is in its normal position.

17. A car stopping device comprising a bumper adapted to normally lie between the rails along which the car travels so as to be out of the way, a retarding device with which said bumper is movably connected and adapted when moved to retard the movement of the bumper and a controlling device for moving said bumper to an operative position where it will be struck by the car, and protecting means for protecting all the parts from dirt and injury.

In testimony whereof, I affix my signature in the presence of two witnesses this 19th day of November 1914.

JOSEPH B. STRAUSS.

Witnesses:
MINNIE M. LINDENAU,
BESSIE S. RICE.

Copies of this patent may be obtained for five cents each, by addressing the "Commissioner of Patents, Washington, D. C."